United States Patent
Ishida

(10) Patent No.: US 8,777,426 B2
(45) Date of Patent: Jul. 15, 2014

(54) PROJECTION TYPE DISPLAY

(75) Inventor: Yusuke Ishida, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 93 days.

(21) Appl. No.: 12/474,737

(22) Filed: May 29, 2009

(65) Prior Publication Data

US 2009/0296050 A1    Dec. 3, 2009

(30) Foreign Application Priority Data

May 30, 2008    (JP) .................................. 2008-142277

(51) Int. Cl.
*G03B 21/26*    (2006.01)
(52) U.S. Cl.
USPC ........................................... 353/101; 348/745
(58) Field of Classification Search
USPC ........................ 353/101, 100, 70, 69; 348/745
See application file for complete search history.

(56) References Cited

U.S. PATENT DOCUMENTS

| | | | |
|---|---|---|---|
| 5,394,205 A * | 2/1995 | Ochiai et al. ................... | 353/101 |
| 5,899,586 A | 5/1999 | Kawanami | |
| 6,886,946 B2 | 5/2005 | Eguchi | |
| 7,792,420 B2 * | 9/2010 | Kusaka ............................ | 396/79 |
| 7,891,826 B2 * | 2/2011 | Fujinawa et al. ............. | 353/119 |
| 2006/0152617 A1 * | 7/2006 | Konishi ........................ | 348/345 |
| 2007/0002287 A1 * | 1/2007 | Matsumoto et al. ............ | 353/85 |
| 2007/0252955 A1 * | 11/2007 | Asai ................................ | 353/69 |

FOREIGN PATENT DOCUMENTS

| | | | |
|---|---|---|---|
| JP | 57-079922 | A | 5/1982 |
| JP | 58-085407 | A | 5/1983 |
| JP | 5-188282 | A | 7/1993 |
| JP | 9-211298 | A | 8/1997 |
| JP | 2004-093890 | A | 3/2004 |
| JP | 2004-102009 | A | 4/2004 |
| JP | 2005-010665 | A | 1/2005 |
| JP | 2005-147959 | A | 6/2005 |
| JP | 2006-003543 | A | 1/2006 |

* cited by examiner

*Primary Examiner* — Francis M Legasse, Jr.
*Assistant Examiner* — Jerry Brooks
(74) *Attorney, Agent, or Firm* — Canon U.S.A., Inc. IP Division

(57) ABSTRACT

A projection type display includes an optical system that includes a focus lens and is configured to project an image, a driver configured to move the focus lens along an optical axis, a phase difference sensor configured to receive light of the image that has been projected, and a controller configured to calculate a phase difference based on an output of the phase difference sensor, to calculate an in-focus position based on the phase difference that has been calculated, and to move the focus lens via the driver to the in-focus position for a focus control of the optical system, wherein the controller provides the focus control while a current position of the focus lens is located within an allowable range that is previously set in a movable range over which the focus lens can move along the optical axis.

8 Claims, 3 Drawing Sheets

PROJECTION TYPE DISPLAY

BACKGROUND OF THE INVENTION

1. Field of the Invention

The present invention relates to a projection type display configured to project an image onto a projection surface.

2. Description of the Related Art

Conventionally, a projector configured to provide autofocus ("AF") utilizing a phase difference detection method is known. See, for example, Japanese Patent No. 3,120,526 and Japanese Patent Laid-Open No. 2004-102009. A projector configured to provide the AF utilizing a mountain climbing method is also known. The mountain climbing method is an approach to measure the contrast of a projected image by slightly moving a focus position, and to determine a contrast peak position to be an in-focus position to be focused in the AF. Characteristically, the mountain climbing method can more stably and precisely calculate the in-focus position than the phase difference detection method. However, the mountain climbing method repeats lens driving and a contrast measurement process many times, and thus requires a longer time to complete the AF than the phase difference detection method.

In order to improve the focusing precision and to shorten the process time period of the AF, a hybrid method is proposed which quickly moves a focus lens near to an in-focus position by the phase difference detection method, and then moves the focus lens to the in-focus position by the mountain climbing method so as to improve the focusing precision. See, for example, Japanese Patent Laid-Open No. 2004-93890.

However, the hybrid method that combines the phase difference detection method and the mountain climbing method still needs a longer time to complete the AF due to a combination with the mountain climbing method, and thus it is preferred to avoid the combination with the mountain climbing method as long as the focusing precision is secured. Nevertheless, when a projected image significantly blurs because the focus lens is distant from the in-focus position, the in-focus position cannot be precisely calculated by utilizing only the phase difference detection method.

SUMMARY OF THE INVENTION

The present invention provides a projection type display configured to shorten a time period to complete the AF with a stably improved focusing precision.

A projection type display according to one aspect of the present invention includes an optical system that includes a focus lens and is configured to project an image, a driver configured to move the focus lens along an optical axis, a phase difference sensor configured to receive light of the image that has been projected, and a controller configured to calculate a phase difference based on an output of the phase difference sensor, to calculate an in-focus position based on the phase difference that has been calculated, and to move the focus lens via the driver to the in-focus position for a focus control of the optical system, wherein the controller provides the focus control while a current position of the focus lens is located within an allowable range that is previously set in a movable range over which the focus lens can move along the optical axis.

Further features of the present invention will become apparent from the following description of exemplary embodiments with reference to the attached drawings.

DESCRIPTION OF THE EMBODIMENTS

Figure 1:
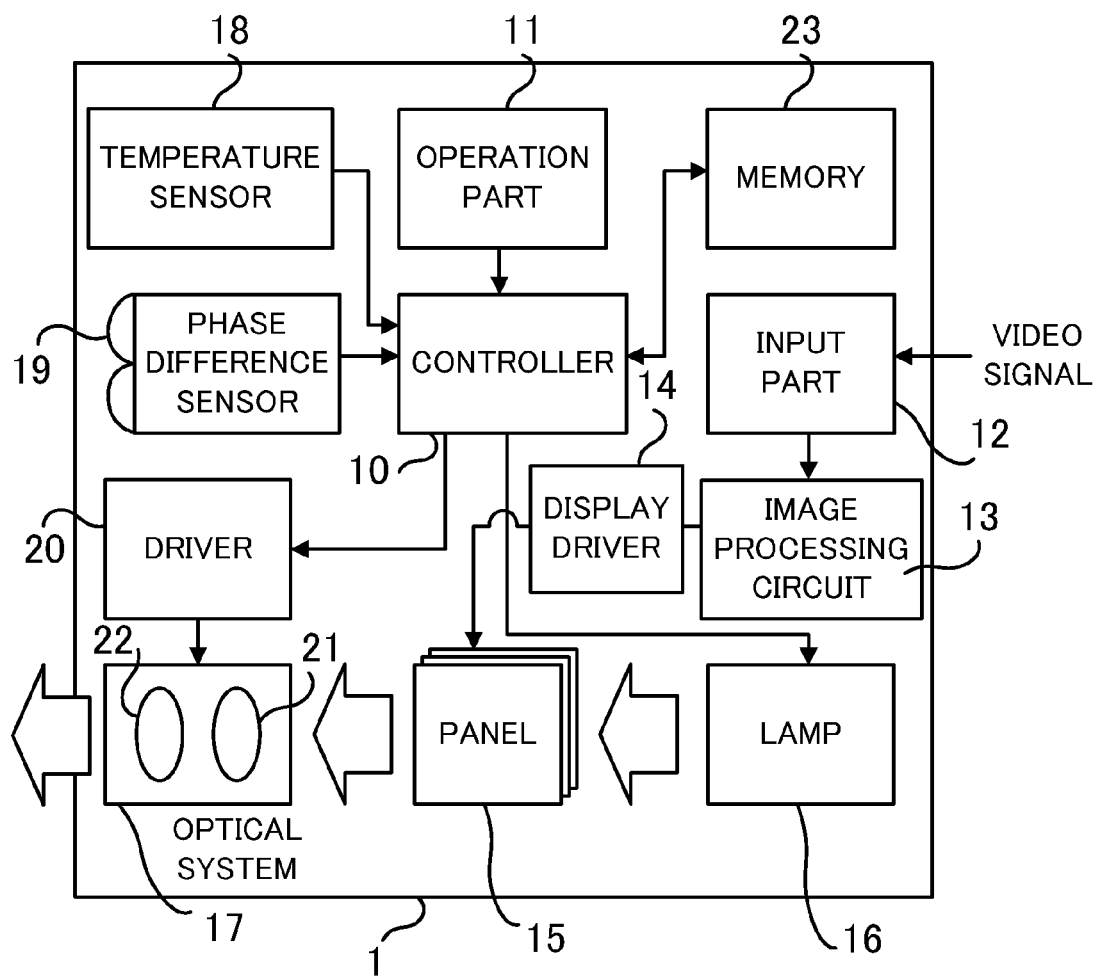
FIG. 1 is a block diagram of a liquid crystal projector (projection type display) according to this embodiment.

FIG. 1 is a block diagram of a liquid crystal projector (projection type display) 1 according to this embodiment. The liquid crystal projector 1 includes, as shown in FIG. 1, a controller 10, an operation part 11, an input part 12, an image processing circuit 13, a display driver 14, a liquid crystal panel 15, a light source lamp 16, an optical system 17, a temperature sensor 18, a phase difference sensor 19, a driver 20, and a memory 23.

The operation part 11 includes a power switch configured to turns on and off the power, an AF switch configured to perform an AF operation, etc. The input part 12 inputs a video signal into the liquid crystal projector 1. The image processing circuit 13 receives the video signal input from the input part 12, and synchronously separates this video signal through its decoder into RGB video signals and to provide digital processing, such as a color correction of the video signal, for these signals.

The display driver 14 inputs a driving signal corresponding to the gradation-corrected RGB image signals into the liquid crystal panel 15, and the liquid crystal panel 15 is a timing generator configured to display a liquid crystal image. The liquid crystal panel 15 displays an image-processed video signal corresponding to each of the RGB colors, and the liquid crystal panel 15 is illuminated by the light source lamp 16. The optical system 17 projects the video signal of the liquid crystal panel 15 onto a screen, and includes a zoom lens 21 and a focus lens 22, which can be arbitrarily driven.

The temperature sensor 18 is arranged near the phase difference sensor (light receiving means) 19, and detects the temperature of the phase difference sensor 19. The phase difference sensor 19 receives the projected image and outputs image data so as to calculate a distance to the projection image surface on the basis of a triangulation principle. The driver 20 moves the focus lens 22 along the optical-axis direction to the in-focus position calculated by the controller 10 based on the distance calculated by using the image data taken from the phase difference sensor 19. The memory 23 stores a variety of set values, such as a temperature-sensor correction table used to correct an output value of the temperature sensor.

The controller 10 is a control circuit that includes a micro computer configured to control these processes in accordance with operations of each switch of the operation part 11, including power-on and power-off, the AF operation, the illumination control, such as turning on and off of the light source lamp 16, and a measurement of an elapsed time period from the start time. In addition, the controller 10 operates a shift amount based on the image data taken from the phase difference sensor 19 and the video display timing, corrects the temperature detected by the temperature sensor 18 and the shift amount by referring to the temperature sensor correction table in the memory 23, and calculates the distance information. Moreover, the controller 10 calculates the in-focus position for the focus lens 22 in the optical system 17 based on this distance information, and controls the driver 20 so as to move the focus lens 22 to the in-focus position.

Figure 2:
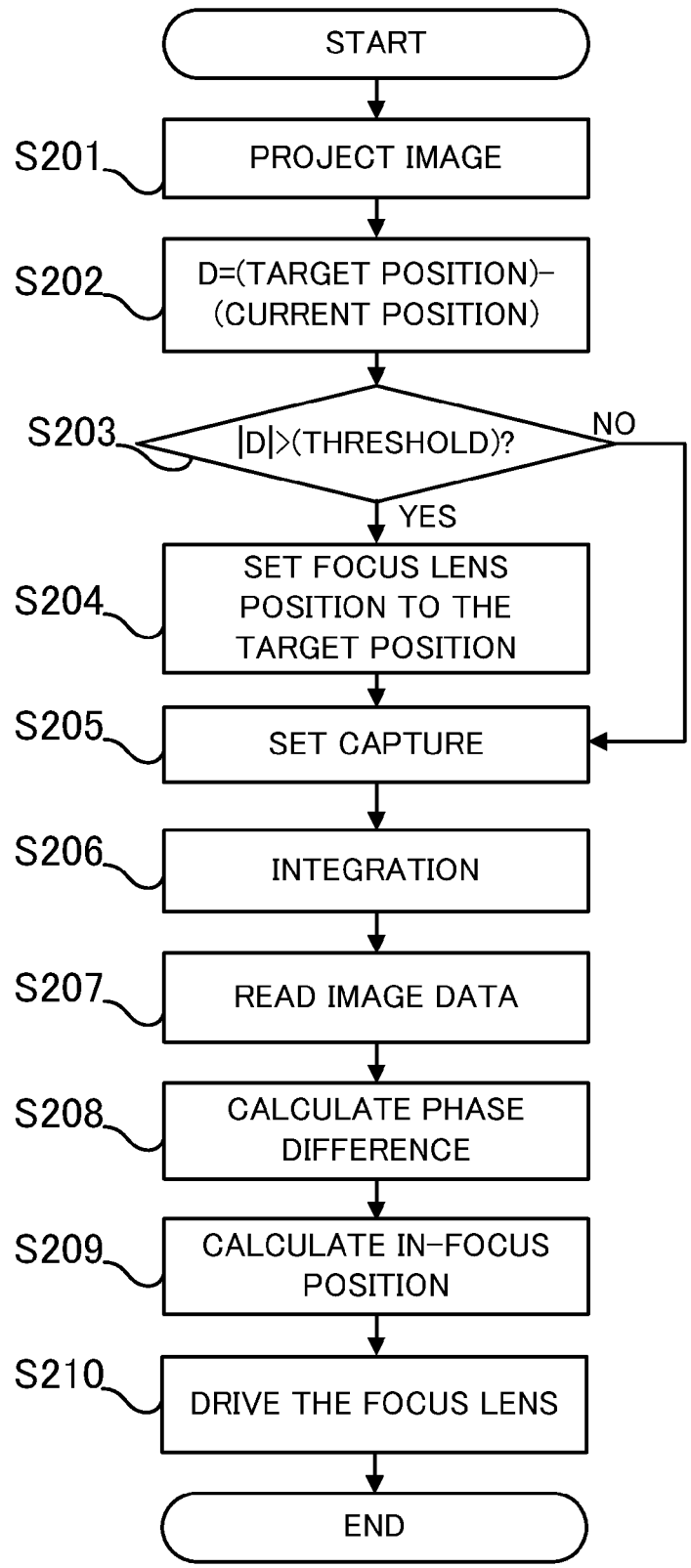
FIG. 2 is a flowchart for explaining an AF operation of the liquid crystal projector shown in FIG. 1.

Referring now to FIG. 2, a description will be given of the AF operation of this embodiment. When detecting that the AF switch is operated in the operation part 11, the projector starts the AF operation. FIG. 2 is a flowchart for explaining the AF operation, and "S" means the step.

Initially, the controller 10 projects an image onto a projection surface (such as a screen) via the light source lamp 16 so as to detect a phase difference (S201). The projected image may be a pattern as disclosed in Japanese Patent No. 3,120,526, or a uniform image (such as an entirely white image) as disclosed in Japanese Patent Laid-Open No. 2004-102009, for example.

Next, the controller 10 calculates a difference D between the target position and the current position (S202). The target position is previously set to a position that does not cause an excessive blur of the projected image even when a distance from the optical system 17 to the projection surface changes. For example, the center position in the focus movable range or a position near the center position may be set to the target position.

The controller 10 determines whether the current position is located within an allowable range with respect to the target position (S203). When the focus lens 22 is located within the allowable range, the controller 10 does not drive the focus lens 22 via the driver 20. When the position of the focus lens 22 is located outside the allowable range, the controller 10 moves the focus lens 22 to the target position via the driver 20 (S204). S204 may be performed without S202 and S203, because the focus lens 22 may be always moved to the target position irrespective of its current position.

Figure 3:
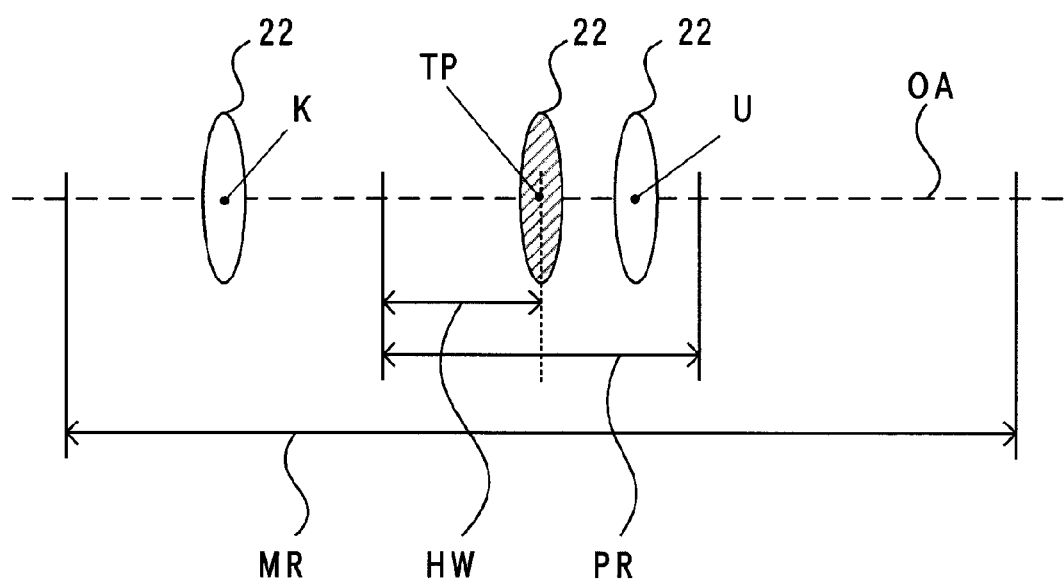
FIG. 3 is an optical-path diagram for explaining a relationship between a target position and an allowable range.

FIG. 3 is an optical-path diagram for explaining a relationship between the target position and the allowable range. Assume that the focus lens 22 is configured to move along an optical axis OA over a movable range MR of the focus lens 22 in FIG. 3. The movable range MR of the focus lens 22 is a range in which the focus lens 22 can move along the optical axis. When it is assumed that TP denotes the target position, this embodiment sets an allowable range PR to a range that has an equal width HW before and after the target position TP. However, the allowable range PR may not have the equal width HW before and after the target position TP, and may have unequal widths before and after the target position TP. A threshold used for S203 relative to the allowable range PR is a width HW that is half as wide as the allowable range PR. For example, when the focus lens 22 is located at a position U in the permissible range, the flow moves from S203 to S205, and the focus lens 22 is not driven. On the other hand, for example, when the focus lens 22 is located at a position K outside the allowable range, the flow moves from S203 to S204 to move the focus lens 22 to the target position TP. In S204, the controller 10 moves the focus lens 22 at a high velocity via the driver 20, shortening a focus control time period. The velocity at this time is higher than the velocity used for the focus control.

When the controller 10 determines that the focus lens 22 is located within the allowable range (No in S203) or after S204, the controller 10 sets the light receiving of the phase difference sensor 19 (S205). The set items include, for example, a capture starting pixel, an integration mode, and gain setting.

Next, the phase difference sensor 19 starts receiving light of the projected image on the screen, and the controller 10 integrates the received light quantity (S206). Next, the controller 10 takes in image data for the number of designated pixels from the capture starting pixel set by S205 (S207). Next, the controller 10 operates a correlation for the left and right captured pixel data, and obtains, for example, as a phase difference an image shift amount that provides a maximum correlation value (S208). Since the phase difference and the in-focus position of the focus lens 22 have a linear relationship, the controller 10 calculates the in-focus position (S209). Finally, the controller 10 moves the focus lens 22 to the in-focus position (S210).

This embodiment reduces the number of drives of the lens in comparison with the combination of the phase difference detection method and the mountain climbing method, shortening a time period necessary to complete the AF. In addition, the controller 10 provides the focus control while the current position of the focus lens 22 is located in the allowable range PR in which a blur of the projected image can be maintained within an allowable range, which allowable range PR is previously set in the movable range MR over which the focus lens 22 can move along the optical axis OA. Therefore, the focusing precision can be made stable without the need for using the combination of the phase difference detection method and the mountain climbing method.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-142277, filed May 30, 2008, which is hereby incorporated by reference herein in its entirety.

What is claimed is:

1. A projection type display comprising:
an optical system including a focus lens and configured to project an image formed by an image modulator to a projection surface;
a driver configured to move the focus lens along an optical axis with respect to the image modulator and the projection surface;
a phase difference sensor configured to receive light of the image that has been projected; and
a controller configured to calculate an in-focus position and to move the focus lens via the driver to the in-focus position for a focus control of the optical system,
wherein in a case that, in a movable range of the focus lens along the optical axis, a part of the movable range where a blur of a projected image falls within a predetermined range even when a projection distance changes is defined as an allowable range, the controller,
when the focus lens is located outside the allowable range, moves the focus lens to a predetermined position within the allowable range, and then calculates the in-focus position based on an output of the phase difference sensor to move the focus lens to the in-focus position.

2. The projection type display according to claim 1, wherein the controller moves, when the focus lens is located outside the allowable range, the focus lens to the position within the allowable range at a velocity higher than that of the focus control.

3. The projection type display according to claim 1, wherein the allowable range includes a center position of the movable range.

4. The projection type display according to claim 1, wherein, in a case that the focus lens is located within the allowable range, the blur of the projected image falls within the predetermined range even when the projection distance changes.

5. The projection type display according to claim 1, wherein, in a case that the focus lens is located within the allowable range, the controller calculates an in-focus position without moving the focus lens.

6. The projection type display according to claim 1, wherein, in a case that the focus lens is located outside the allowable range, the controller moves the focus lens, and then set a light receiving of the phase difference sensor.

7. The projection type display according to claim 1, wherein, in a case that the focus lens is located outside the allowable range, the controller moves the focus lens, and then starts a light receiving of the phase difference sensor.

8. The projection type display according to claim 1, wherein, in a case that the focus lens is located outside the allowable range, the controller does not calculate an in-focus position until the driver moves the focus lens to within the allowable range.

\* \* \* \* \*